United States Patent [19]
Bauer

[11] 3,778,822
[45] Dec. 11, 1973

[54] SUM-RANK NORMALIZED DETECTION APPARATUS

[75] Inventor: Lowell W. Bauer, Liverpool, N.Y.

[73] Assignee: General Electric Company, Syracuse, N.Y.

[22] Filed: Apr. 27, 1972

[21] Appl. No.: 248,059

[52] U.S. Cl. ............................................. 343/5 R
[51] Int. Cl. ........................................... G01s 9/02
[58] Field of Search ........................... 343/5 R, 7 A

[56] References Cited
UNITED STATES PATENTS

| | | | |
|---|---|---|---|
| 3,701,149 | 10/1972 | Patton et al. | 343/7 A |
| 3,374,479 | 3/1968 | Moore | 343/7 A |
| 3,611,369 | 10/1971 | Maguire | 343/7 A |
| 3,391,403 | 7/1968 | Phillips, Jr. | 343/5 R |

Primary Examiner—Malcolm F. Hubler
Attorney—Carl W. Baker et al.

[57] ABSTRACT

This disclosure is of a normalized detector for use with radar, sonar and other pulse-echo systems. The detector comprises a summing unit and a ranking unit which together provides a continuous estimate of the amplitude of interference and noise received in resolution cells near to that of the input signal sample. The summing unit in one embodiment comprises an integrator which provides a plurality of sum signals representative of the interference noise level during selected time periods, which signals then are ranked among one another in the ranking unit to generate an output deriving from the sum signals weighted as a function of their respective ranks. The signal output of this ranking unit is the normalizing or threshold signal against which the input signal sample is compared.

7 Claims, 4 Drawing Figures

SUM-RANK NORMALIZED DETECTION APPARATUS

BACKGROUND OF THE INVENTION

The term "normalization" as used in radar, sonar and related arts describes a detection technique in which the detection threshold is adjusted according to an estimate of local interference power. Such detectors operate with constant false alarm ratio (CFAR) in certain types of stationary or slowly-changing interference. The most commonly proposed normalization procedure consists of estimating interference power by summing detected interference samples from resolution cells grouped in range, frequency or angular resolution about the particular cell to be tested for target energy. This "sum normalizer" is optimum in the sense that, when interference is gaussian and square law detected, it makes a maximum likelihood estimate of interference power. The problem with the sum normalizer comes when interference power changes suddenly, as occurs, for example, when the interference is impulsive noise or when there are multiple targets. In the former case, the probability of false alarm (PFA) does not remain constant, while in the latter case targets tend to suppress one another by raising the threshold level.

It has been found that a normalizer using the median (central value of ranked samples) rather than the mean (average value of summed samples) of interference performs very well in multiple target and impulsive noise environments, since a few large samples have relatively little affect on the median value of the interference. However, a median normalizer requires about twice as many samples to achieve the same detection efficiency as a sum normalizer in stationary gaussian interference, and it does not have a particularly good PFA characteristic in rapidly changing interference. Also, since median normalization requires the ranking of many random variables, it may be difficult to implement in a practical system.

The sum-rank procedure of the present invention combines mean and median normalization techniques in a manner to preserve most of the respective advantages of each while avoiding its disadvantages, and at the same time this sum-rank procedure lends itself to implementation in relatively simple and reasonably inexpensive form. It is accordingly a primary objective of the present invention to provide methods and apparatus utilizing combined mean and median normalization enabling optimized target detection with low probability of false alarm even in multi-target, strong interference and other adverse operating situations.

SUMMARY OF THE INVENTION

In one preferred form, the sum-rank normalization detector disclosed in greater detail below comprises a summation unit in which signals received over a selected time period are grouped into subsets from each of which a sum signal is derived. Each such sum signal is representative of an integration or summation of a subset of the total signal received over portions of the selected time period of equal duration. The sum signals are communicated to a ranking unit which generates a normalization or threshold signal deriving from the sum signals weighted in accordance with some function of their respective ranks. Signal weighting may be selected to the needs of the particular application; for many applications the preferred weighting is unity for the middle-ranked sum signals and zero weighting for both the higher and lower-ranked, thus effectively discarding them. This weighting tends to favor probability of detection; where limiting the peak value of the probability of false alarm is the critical factor this may be optimized by assigning unity weighting to the highest-ranked of the sum signals and zero weighting to all others. In any case, the resultant signal is compared in a comparison unit to the received signal sample of interest to determine whether that signal exceeds the threshold level determined by the ranking unit in the manner just explained.

These and other features and advantages of the invention will be apparent to those skilled in the art from the following description of the invention taken in conjunction with the attached drawings in which.

DESCRIPTION OF THE INVENTION

Figure 1:
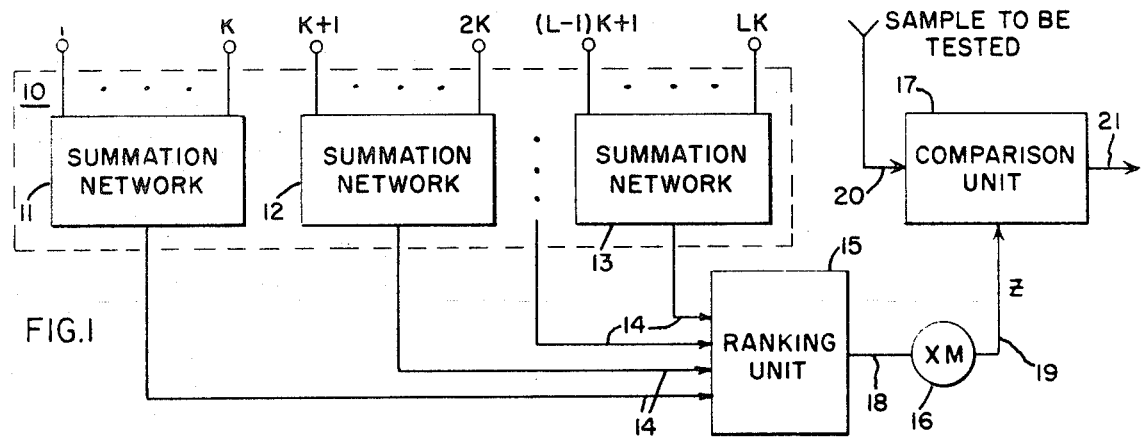
FIG. 1 is a block diagram of a normalized detector in accordance with the present invention.

FIG. 1 is a block diagram depicting an embodiment of the present invention which comprises a summation unit 10, a ranking unit 15, a multiplier 16, and a comparison unit 17. Summation unit 10 comprises a plurality of individual summation networks of which summation networks 11, 12 and 13 are illustrated. Each summation network has K input terminals and one output terminal. The K input terminals of each summation network 11, 12 and 13 receive input signals from a radar or other pulse-echo receiver (not shown) and each of the summation networks operates to derive a measure of the mean of the input signals appearing at its respective input during a predetermined time period.

The output from each of the summation networks 11, 12 and 13 is communicated by lines 14 to ranking unit 15. Ranking unit 15, which is described in detail below, generates an output which is communicated over line 18 to multiplier 16. Multiplier 16 multiplies the output from ranking unit 15 by a constant value M to generate a normalization or threshold signal Z which is communicated over line 19 to a first input of comparison unit 17.

A given received signal sample to be tested for target signal content is communicated over line 20 to a second input of comparison unit 17. In comparison unit 17 the sample is compared with the normalization signal Z to determine whether the sample has a large enough relative amplitude to warrant being called as a target. An output signal from comparison unit 17 containing the result of the comparison appears on output line 21 for transmittal to associated display or control apparatus.

In operation of the embodiment shown in FIG. 1, received signals containing noise, interference and occasional echo pulses are communicated to the input terminals of summation unit 10. The input signals represent samples of power levels in a plurality of resolution cells which are spaced in range, frequency or angular position about the cell from which the sample on lead 20 is taken. These signals may be gathered through any of a number of well known techniques, as for example by use of a multi-tap delay line having its center tap connected to lead 20, each of its other taps connected to one of the input terminals of summation unit 10, and an end input directly from the receiver. The summation unit inputs then will together comprise a range resolution cell sequence which is centered in time with respect to the lead 20 input.

Summation unit 10 is shown capable of receiving N input signals by employing L summation networks each receiving K input signals where $N = L \times K$. The K input signals received at each of the L summation networks are added together by summation networks 11, 12 and 13 and the respective resultant sums are communicated from summation unit 10 over lines 14 to ranking unit 15.

Figure 2:
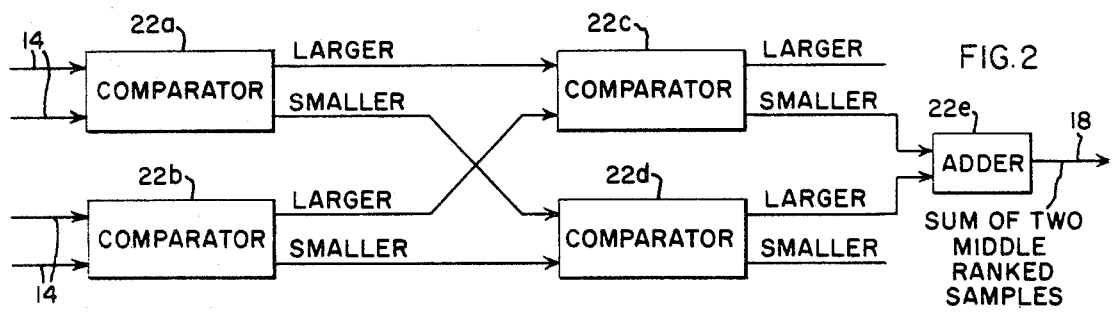
FIG. 2 is a block diagram of a ranking unit suitable for use in the detector of FIG. 1.

Ranking unit 15 operates upon the small number of resultant sums of the individual summation networks of summation unit 10 and not directly upon the large number of individual input signals received by summation unit 10. Therefore, one of the ranking units known in the art may be employed which operate on a small number of input signals to determine, for example, the median value of the input signals or, in the alternative, the sum total of the two middle or centrally ranked inputs. One such known ranking unit is illustrated in FIG. 2, in which the sum signals on leads 14 are paired as inputs to two comparators 22a and 22b having their outputs connected as shown as inputs to two other comparators 22c and 22d. As indicated, the operation of this combination of comparators is such as to output to adder 22e the two middle-ranked of the four inputs on leads 14, the highest and lowest ranked of these inputs being discarded.

The output signal from ranking unit 15 (FIG. 1) is multiplied by a constant value M in multiplier 16 to generate a threshold signal Z which is communicated to a first input of comparison unit 17. The value chosen for M is dependent on the number of inputs per summation network, on the particular type of ranking performed by ranking unit 15, on the desired detector false alarm rate, and on the input requirements of comparison unit 17. In general, increasing M raises the detection threshold and lowers the detector false alarm rate.

Figure 3:
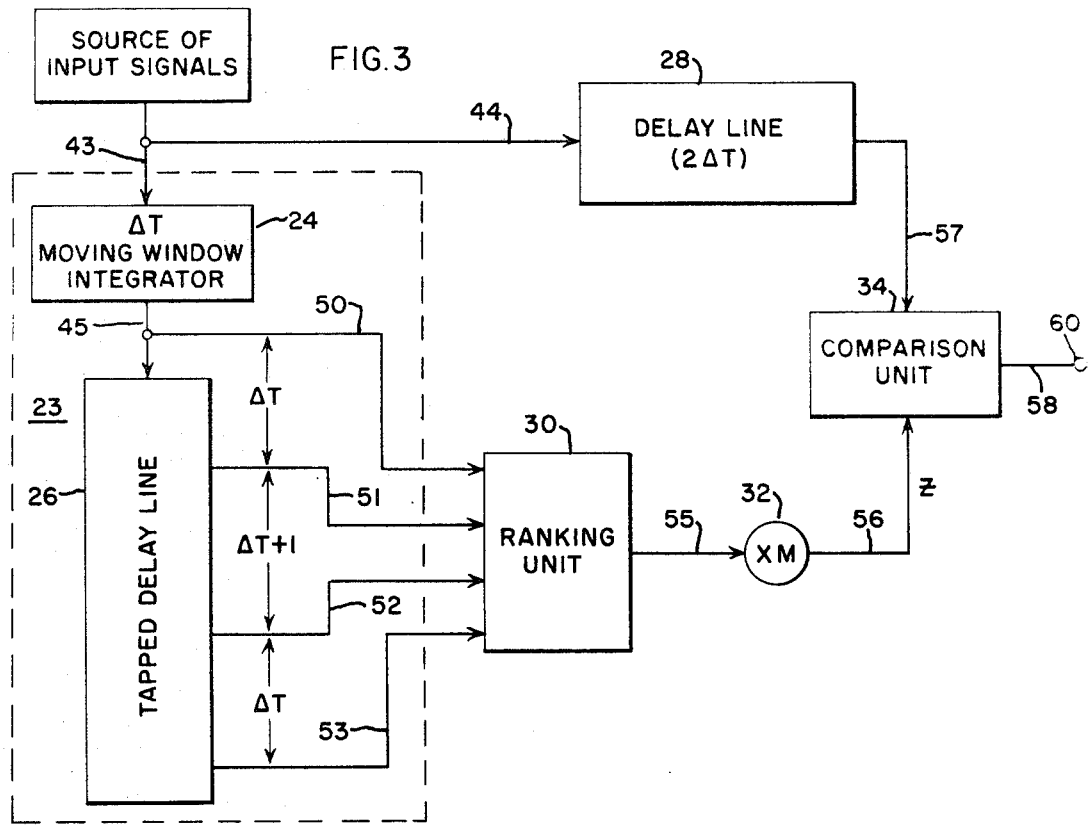
FIG. 3 is a block diagram of another embodiment of the invention.

FIG. 3 shows an alternate embodiment of the present invention in which a series of signals gathered sequentially in time is operated on by a summation unit 23 which is designed to operate as though it comprised an even number of summation networks. Summation unit 23 comprises moving window integrator 24 and tapped delay line 26; delay line 28; ranking unit 30; multiplier 32; and comparison unit 34. The input to summation unit 23 is a series of signals gathered in time sequence and communicated by line 43 to the input of moving window integrator 24 and by line 44 to the input of delay line 28. Integrator 24 continually integrates K sequential input signals and communicates the results of the integrations over line 45 to the input of tapped delay line 26. The output from integrator 24 is also communicated directly to ranking unit 30 over line 50.

The summation unit 23 comprises a tapped delay line 26 which is provided with an odd number of output taps 51, 52 and 53. Lines 50 and taps 51, 52 and 53 are all individually connected to inputs of ranking unit 30. Ranking unit 30 is responsive to signals appearing on line 50 and taps 51, 52 and 53 to generate a ranking signal over line 55 to multiplier 32. Multiplier 32 weights the ranking signal by a factor M to generate a threshold signal transmitted by line 56 to a first input of comparison unit 34, which has as its second input the output of delay line 28. The output of comparison unit 34 is communicated over line 58 to output terminal 60.

In operation, the K most recent of the input signals communicated over line 43 to moving window integrator 24 are continuously integrated thereby, and the resultant sum signal is outputted over line 45 to tapped delay line 26. Therefore, for each new input signal to integrator 24, a sum signal representing the integration or sum of the most recent K signals is sent to tapped delay line 26. A moving window or nonrecursive integrator which may be employed is described in Radar Handbook; Merrill Skolnik, McGraw Hill 1970, page 15-18.

Tapped delay line 26 acts to delay or store the sum signals from integrator 24. Signals appearing at output tap 51 of delay line 26 have been delayed $\Delta T$ from the time they first entered delay line 26, where $\Delta T$ is equal to the time period required for reception of one or some selected larger number of subsets of K input signals. Thus for $\Delta T$ set equal to the time interval through which one such signal subset is received, the $\Delta T$ time delay indicated between taps 50 and 51 of delay line 26 will cause the sum signal representing input samples K + 1 through 2K to appear at one of these taps when the signal representing samples 1 through K appears at the other. The time delay between signals appearing at tap 52 and tap 53 of delay line 26 is also $\Delta T$; the delay between tap 51 and 52 is $\Delta T + 1$.

Summarizing the operation of delay line 26, when enough time has passed for 4K + 1 input signals to have been sequentially inputted, with 1 being the oldest and 4K + 1 being the newest signal, the sum of input signals 1 through K is at tap 53, the sum of input signals K + 1 through 2K is at tap 51, the sum of input signals 2K + 2 through 3K + 1 is at tap 52 and the sum of input signals 3K + 2 through 4K + 1 is at line 50. The only input signal not appearing as part of a sum on line 50 or taps 51, 52 and 53 is input signal 2K + 1. Input signal 2K + 1 occurs 2 $\Delta T$ time periods before the sum signal which appears at line 50 and therefore input signal 2K + 1 appears on line 57 if delay line 28 has a delay period of 2 $\Delta T$. It should also be noted, that the input signal 2K + 1 occurs precisely in the middle of the 4K + 1 input signals.

The sum signals on line 50 and taps 51, 52 and 53 are all communicated to ranking unit 30 wherein the largest and the smallest of the sums are discarded and the amplitudes of the center or intermediate two sums are added together and communicated over line 55 to multiplier 32. It may be seen that if two reflected target information pulses are received during a given time period in which 4K + 1 samples are received and one of the two pulses is the sample 2K + 1, then the sum signal appearing in line 50 or taps 51, 52 or 53 in which the other reflected target information pulse appeared is discarded by ranking unit 30 if the pulse causes that sum to have a high value. The output from ranking unit 30 is communicated by line 55 to multiplier 32 where it is weighted by a factor M determined as hereinbefore explained.

The number of taps shown on delay line 26 and the method of ranking are not limited to the number and arrangement described above. In general terms, if delay line 26 has an odd number of taps $(2p + 1)$ where $p$ is any integer, then the first tap is positioned to provide a time delay $\Delta T$ and each succeeding tap is positioned from a preceding tap a distance so as to provide a $\Delta T$ delay except that taps $p$ and $p + 1$ are spaced apart a distance from each other so as to provide a time delay equal to $\Delta T + 1$. In addition, delay line 28 preferably provides a delay period of $(p + 1) \Delta T$, as this assures that the sample tested at comparison unit 34 will have been received in the middle of the signals in delay line 26 and also assures that it will not be included in the sum signals sent to ranking unit 30.

Should the number of sums introduced to ranking unit 30 be chosen to be an odd number rather than an even number as shown in FIG. 3, the sample derived from the output of delay line 28 would no longer be precisely in the center of the resultant sum signals and there could not be two centrally ranked sums. For most operations, the resultant slight offcentering of the sample from delay line 28 would have little effect on the operation of the invention, and therefore the embodiment disclosed in FIG. 3, while operating best with an even number of sums, will also function with an odd number of sums.

Figure 4:
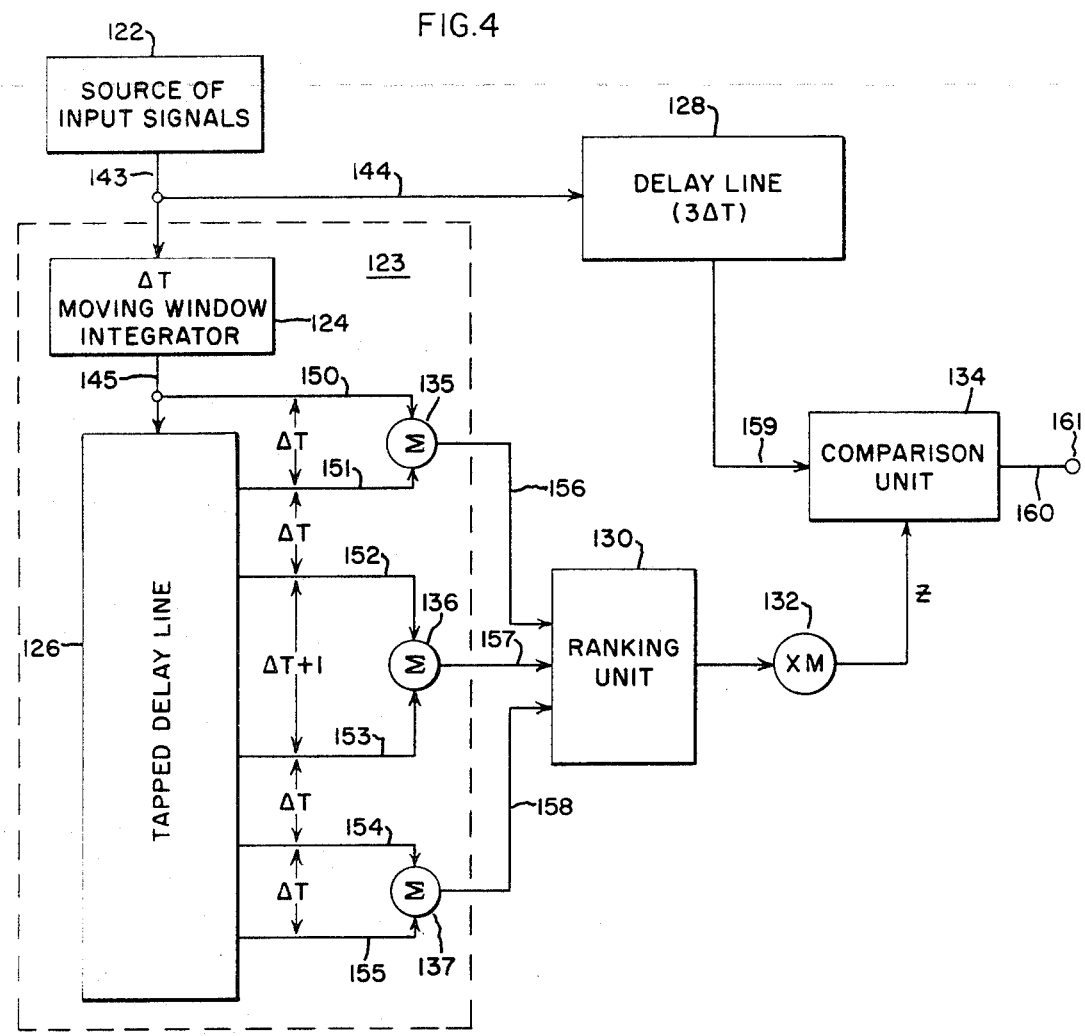
FIG. 4 is a block diagram of a further embodiment of the invention.

FIG. 4 shows another embodiment of the invention in which the summation unit operates as though it comprises an odd number of summation networks. This embodiment includes a source of input signals 122, a summation unit 123 comprising moving window integrator 124 and tapped delay line 126; delay line 128; ranking unit 130; multiplier 132 and comparison unit 134 which are all generally equivalent to similarly designated units in FIG. 3. The embodiment in FIG. 4, however, also includes in summation unit 123, first, second and third summing units 135, 136 and 137 which are not shown in FIG. 3.

The output from source 122 is communicated by line 143 to the input of moving window integrator 124 and the output from source 122 is further communicated by line 144 to an input of delay line 128. An output from moving window integrator 124 is communicated over line 145 to an input of tapped delay line 126. The output from integrator 124 is also communicated to a first input of summing unit 135.

The summation unit 123 operates as though it comprised an odd number of summation units by employing tapped delay line 126 which is provided with five output taps 151, 152, 153, 154 and 155. Tap 151 is connected to a second input of summing unit 135. Tap 152 is connected to a first input while tap 153 is connected to a second input of summing unit 136 and tap 154 is connected to a first input while tap 155 is connected to a second input of summing unit 137. The output from each summing unit 135, 136 and 137 is connected to an individual input of ranking unit 130. The output of ranking unit 130 is connected to multiplier 132 and the output of multiplier 132 is connected to a first input of comparison unit 134.

As shown, line 144 is connected between the output of source 122 and an input of delay line 128. The output of delay line 128 is connected by line 159 to a second input of comparison unit 134. The output of comparison 134 is connected by line 160 to output terminal 161.

In operation, signals appearing at output tap 151 of delay line 126 have been delayed a time $\Delta T$ from the time they first entered delay line 126, where $\Delta T$ again represents the time necessary for one or more subsets of K signals to be received. The time delay between signals appearing at tap 152 and tap 151; between tap 153 and tap 154; and tap 154 and tap 155 is also $\Delta T$. However, the delay between tap 153 and tap 152 which is represented as $\Delta T + 1$, equals the amount of time needed for $K + 1$ samples to be generated from source 122. For a given $6K + 1$ sequential input signals generated by source 22, with 1 being the oldest and $6K + 1$ being the newest, the only signal not appearing as part of a sum on line 150 or taps 151, 152, 153, 154 and 155 is input signal $3K + 1$. Input signal $3K + 1$ occurs $3 \Delta T$ time periods before the sum signal which appears at line 150 and therefore input signal $3K + 1$ appears on line 159 if delay line 128 has a delay time period of $3 \Delta T$.

The signals on lines 150 and 151 are summed together in summing unit 135 to generate a resultant sum on line 156, the signals on lines 152 and 153 are summed together by summing unit 136 to generate a resultant sum on line 157; and the signals on taps 154 and 155 are summed together in summing unit 137 and a resultant sum is generated on line 158. These lines connect to separate inputs of ranking unit 130 and their respective signals compared by it, with the largest and smallest signals being discarded and the center or intermediate ranking signal being communicated from the output of ranking unit 130 to multiplier 132 where the signal is weighted by a factor M to output the desired normalization or threshold signal Z.

It will be understood that the number of taps taken from delay line 126 while necessarily having to be an odd number may be a number other than five. In general terms, if delay line 126 has an odd number of taps $(2p + 1)$ where p is an even integer, the first tap is positioned to provide a time delay $\Delta T$ and each succeeding tap is positioned from a preceding tap a distance so as to provide a $\Delta T$ delay except that taps p and $p + 1$ are spaced apart to provide a time delay of $\Delta T + 1$. In addition, delay line 128 must provide a delay period of $(p + 1) \Delta T$. This arrangement also contemplates the use of $p + 1$ summing units such as summing units 135, 136 and 137 to provide $p + 1$ sum signals to ranking unit 130. With the foregoing arrangement the sample signal from delay line 128 will be coincident in time with the middle sum signal $(p/2 + 1)$ even though it is not included in that middle sum signal.

For most applications the preferred ranking procedure entails selection of a centrally disposed group of one or more of the signals being ranked, with discard of the highest and lowest ranked signals as in the exemplary embodiments hereinbefore described. Weighting of the ranked signals in this way tends to favor the optimization of the probability of detection over optimized probability of false alarm. This is to be preferred in most cases, but where for any reason the false alarm ratio must be very strictly limited, a relatively higher estimate of the existing interference level and correspondingly higher threshold may be desirable to achieve this. In such cases the ranking units may be used to select the higher ranked sums and to discard the lower ranked sums, as weighting in this way will yield the desired higher threshold.

It will be understood that this and various other changes may be made in details within the scope of the claims without departing from the spirit of the invention. It is therefore to be understood that the invention is not to be limited to the specific details shown and described.

What is claimed as new and desired to be secured by letters Patent of the United States is:

1. A sum-rank normalization detector comprising:
   a. means for receiving a plurality of input signals;
   b. means for combining said input signals to generate a plurality of sum signals each representing a summation of a number of said input signals;
   c. means for ranking said sum signals to generate a threshold signal or level which is a weighted combination of said ranked sum signals;
   d. means for providing a sample signal from said input signal to be tested for target information; and
   e. means for comparing said sample signal to said threshold signal.

2. A sum-rank normalization detector comprising:
   a. means for receiving a plurality of sequential input signals;
   b. means for grouping said input signals into a plurality of subsets each including p of said input signals where p is any integer, and for generating a plurality of sum signals each representing a summation of one of said subsets;
   c. means for ranking said sum signals and for generating a threshold signal derived from said sum signals weighted as a function of their respective ranks;
   d. means for providing a sample signal from said input signals to be tested for target information; and
   e. means for comparing said sample signal to said threshold signal.

3. The sum-rank normalization detector claimed in claim 2 wherein:
   said second-named means comprises a delay line having an input and an odd number of taps ($2p + 1$) with a first tap spaced from said input to provide delay equal to a time ($\Delta T$) required for reception of a number of said subsets and with each succeeding tap spaced to provide a time delay $\Delta T$ except taps p and $p + 1$ which provide a time delay $\Delta T$ plus a time required for reception of said sample signal, said input and said taps each providing one of said sum signals to said ranking means; and
   said means for providing a sample signal comprises means for delaying said sample signal a time ($p + 1$) $\Delta T$.

4. The sum-rank normalization detector claimed in claim 2 wherein:
   said second-named means comprises an input, $p + 1$ summing units where p is an even integer, and a delay line connected to said input; said delay line having an odd number of taps ($2p + 1$) with a first tap spaced from said input to provide a delay equal to a time $\Delta T$ required for reception of a number of said subsets and with each succeeding tap spaced to provide a time delay $\Delta T$ except taps p and $p + 1$ which provide a time delay $\Delta T$ plus a time required for reception of said sample signal, said input and said first tap being connected to a first of said $p + 1$ summing units and each succeeding two taps being connected to a respective succeeding summing unit, said summing units being connected to said ranking means for communicating $p + 1$ sum signals from said summing units to said ranking means; and
   said means for providing a sample signal comprises a means for delaying said sample signal a time ($p + 1$) $\Delta T$.

5. The sum-rank normalization detector defined in claim 2 wherein the higher and lower ranked of said sum signals are given relatively low weighting and the middle ranked of said sum signals are given relatively high weighting to thus establish a threshold level tending to high probability of detection.

6. The sum-rank normalization detector defined in claim 2 wherein the highest ranked of said sum signals is given relatively highest weighting to thus establish a threshold level tending to low probability of false alarm.

7. The sum-rank normalization detector defined in claim 2 wherein the weighting accorded to certain of said sum signals is unity and to the remainder thereof is zero.

* * * * *